Patented Dec. 21, 1948

2,456,785

UNITED STATES PATENT OFFICE 2,456,785

PRODUCTION OF AMIDES

John A. King, Albany, N. Y., assignor, by mesne assignments, to Winthrop-Stearns Inc., New York, N. Y., a corporation of Delaware No Drawing. Application July 28, 1945,
Serial No. 607,671

7 Claims. (Cl. 260—558)

This invention relates to a method for the production of acid derivatives from aliphatic ketones.

In 1887 Willgerodt discovered that aryl alkyl ketones react at high temperature and under pressure with yellow ammonium polysulfide to form crystalline nitrogenous materials [Ber., 20, 2467 (1887)]. The next year he reported that these products were the amides of the aryl-substituted aliphatic acids containing the same number of carbon atoms as the starting ketones, accompanied by the ammonium salts of these acids [Ber., 21, 534 (1888)]. During the next twenty-four years he extended the reaction, which has in recent years borne his name, to a host of aryl lower alkyl ketones [J. prakt. Chem., (2), 80, 183, 192 (1909); (2), 81, 74, 382 (1910); (2), 84, 383 (1911)].

The Willgerodt reaction may be illustrated by the following equation:

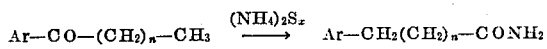

During the past few years this reaction has been improved, and extended to more aryl alkyl ketones. Kindler [Arch. Pharm., 272, 236 (1934); Ber., 74, 321 (1941)] introduced a variant of the reaction in which dimethylamine and sulfur are used in place of the ammonium polysulfide. Schwenk [J. A. C. S., 64, 3051 (1942)] used morpholine and piperidine as the amines in Kindler's variant, with the resultant advantage that the reaction need not be carried out under pressure in a closed system. Modifications such as these where anhydrous conditions are employed result in the formation of thioamides

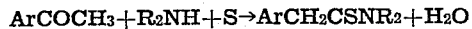

Fieser [J. A. C. S., 62, 1354 (1940)] added dioxane to the ammonium polysulfide, which modification allows the reaction with aryl alkyl ketones to proceed at a lower temperature.

Both Kindler and Schwenk showed that the aryl group can be substituted by certain radicals which are inert under the conditions of the Willgerodt reaction, for example, halo, alkyl, alkoxyl and thioether groups.

I have discovered that the Willgerodt reaction is not limited to aryl alkyl ketones. I have further discovered that aliphatic ketones can be converted under the conditions of the Willgerodt reaction to acids or amides. While the Willgerodt reaction has been extended to cover a large variety of alkyl aryl ketones, never before my discovery has it been known that dialkyl or alkyl aralkyl ketones could be converted into acids or derivatives thereof by this reaction. I have now found the Willgerodt reaction applicable to dialkyl ketones and alkyl aralkyl ketones, including those ketones in which the aryl nucleus may be further substituted by halo, alkyl, aryl, aralkyl, alkoxy, aryloxy, aralkoxy, and thioether groups.

The conditions of the Willgerodt reaction are usually treatment with ammonium polysulfide at elevated temperature and if necessary under pressure in order to retain volatile material. A solvent such as dioxane may be added in order to produce a homogenous reaction mass. A modification of these conditions is the use of sulfur and a secondary amine at elevated temperature instead of ammonium polysulfide. In such case, a substituted thioamide is formed; if the amine is sufficiently high-boiling it is unnecessary to carry out the reaction under pressure.

Elevated temperatures are required for the Willgerodt reaction. The range of temperature which is suitable can be quite wide. Temperatures as high as 330° C. were used by Willgerodt and are suitable for my invention. However, such high temperatures cause more or less resinification of the ketone used, with consequent reduction in yield of the acid derivative. When an organic solvent is added to an aqueous reaction mixture, temperatures of about 150° C. are to be preferred. If no solvent is so employed, the optimum temperature is in the range of 190-210° C. If the reaction mixture does not contain water, as when a secondary amine and sulfur are used, the reaction temperature can be as low as the boiling point of the reaction mixture, which may be 100° C. or lower. The reaction generally requires moderately long periods of time. With aqueous ammonium polysulfide the period varies from 4 to 30 hours. When an organic solvent is added, the time may be decreased to some extent. If water is excluded from the reaction mixture, the reaction often proceeds quite rapidly, in some instances being complete in much less time than required for those reactions carried out in the presence of water.

The Willgerodt reaction is but one of several reactions which may occur. There are a number of competing reactions, all of which take place to some extent, with resulting decreases in yields of acid derivatives. Among these are reduction of the carbonyl group of the ketone to the methylene grouping, formation of substituted thiophenes, cleavage of the ketone to smaller fragments, and resinification of the ketone. These reactions are undesirable and can be eliminated by the proper selection of conditions of temperature, time, and proportions of reagents.

The ammonium polysulfide which I prefer to use is that discovered by Willgerodt to give the most satisfactory results. It is made by saturating concentrated aqueous ammonium hydroxide at ordinary temperature with hydrogen sulfide and then dissolving in the resulting solution that weight of sulfur equal to one-tenth the weight of the solution, the product being a yellow ammonium polysulfide solution. It is, of course, possible to modify the proportions of the components of this solution considerably. In general, however, such changes are not desirable since they promote side-reactions. If, for instance, the relative amount of the sulfur is increased, the amount of cleavage of the ketone is greater. If it is decreased, there is more reduction of the carbonyl group of the ketone to the methylene group. There must, of course, be sulfur present for the conversion of ketones to acids. If there is none, no acid derivative is formed but rather thiophene derivatives are obtained.

The relative amounts of ketone and of ammonium polysulfide solution may vary over a fairly wide range. I have found that 5 parts of ammonium polysulfide solution to 1 part of the ketone gives satisfactory yields of acid derivatives in most cases and these amounts are preferred. In general the sulfur-ketone molar ratio should be in the range of 1 to 10. Even higher ratios are suitable, although uneconomical. While it is necessary that the specific optimum conditions for the reaction be worked out by experiment for each ketone, the process which I disclose and which is illustrated in the appended examples will give satisfactory results with any ketone.

The ketones used can be of any of the usual nonaryl types. They can be symmetrical di-normal-alkyl ketones, such as diethyl ketone. They can be unsymmetrical alkyl ketones, such as methyl isobutyl ketone. The alkyl group can contain a branched chain, such as isobutyl. Either or both of the alkyl radicals can bear aryl substituents provided at least one of the alkyls still has a terminal methyl group. For example, benzyl alkyl ketones such as phenylacetone can be used. The aryl nucleus can be substituted by groups which are inert under the conditions of the Willgerodt reaction.

My invention provides a practical method of obtaining aliphatic and aryl-substituted aliphatic carboxylic acids. In many cases ketones are readily available whereas the corresponding acid derivatives are not. The acids and amides of acids having 6 or more carbon atoms are of value in the manufacture of surface-active agents. Certain aromatically substituted aliphatic acids are made readily available by my process which hitherto have been almost inaccessible. These acids are useful intermediates in the production of pharmaceuticals and perfumes. Also certain branch-chained higher aliphatic acids and their derivatives may now be produced by my method.

My invention is further illustrated by the following examples, which are not intended to limit the scope of the invention.

Example 1

Yellow ammonium polysulfide is prepared by the directions of Willgerodt and Merk [J. Prakt Chem., (2) 80, 192 (1909)] by saturating concentrated ammonium hydroxide at room temperature with hydrogen sulfide and stirring into the solution the amount of sulfur equal to one-tenth the weight of the solution. 3 g. of phenylacetone and 15 g. of ammonium polysulfide are heated for 5 hours at $210\pm5°$ C. in a pressure tube. The solid material (2 g.) is removed from the cooled tube and recrystallized twice from water, giving pure betaphenylpropionamide of M. P. 101.5° C.

Example 2

3 parts of methyl isobutyl ketone and 15 parts of ammonium polysulfide are reacted at $200\pm5°$ C. for 4 hours as in Example 1. The reaction mixture is then extracted with ether, and the ether solution is washed with water, dried and evaporated. 2.45 parts of crystalline isocaproamide is obtained, having a M. P. of 117–118° C. after recrystallization from water.

Example 3

3 parts of diethyl ketone and 15 parts of ammonium polysulfide are reacted at 200° C. for 6 hours. The reaction mixture is then saturated with potassium carbonate and extracted with ether. Removal of the ether leaves n-valeramide, which melts at 100–102° C. after recrystallization from a mixture of petroleum ether and alcohol.

Dipropyl ketone and ammonium polysulfide, treated in the same manner, form oenanthamide M. P. 94–5° C.

Example 4

3 parts of di-n-butyl ketone and 15 parts of ammonium polysulfide are reacted at 200° C. for 24 hours. The solid pelargonamide is removed by filtration. It melts at 94–96° C.

What I claim is:

1. A process for preparing carboxylic acid amides which comprises heating a ketone having the formula R—CO—R′, where R is alkyl and R′ is a member of the group consisting of alkyl and aralkyl, with aqueous ammonium polysulfide at 150–330° C.

2. A process for preparing carboxylic acid amides which comprises heating a dialkyl ketone with aqueous ammonium polysulfide at 150–330° C.

3. A process for preparing carboxylic acid amides which comprises heating a dialkyl ketone with aqueous ammonium polysulfide at about 190–210° C. for about 4–30 hours.

4. A process for preparing beta-phenylpropionamide which comprises heating phenylacetone with aqueous ammonium polysulfide at 150–330° C.

5. A process for preparing beta-phenylpropionamide which comprises heating phenylacetone with aqueous ammonium polysulfide at about 190–210° C. for about 4–30 hours.

6. A process for preparing carboxylic acid amides which comprises heating an alkyl aralkyl ketone with aqueous ammonium polysulfide at 150–330° C.

7. A process for preparing carboxylic acid amides which comprises heating an alkyl aralkyl ketone with aqueous ammonium polysulfide at about 190–210° C. for about 4–30 hours.

JOHN A. KING.

REFERENCES CITED

The following references are of record in the file of this patent:

UNITED STATES PATENTS

| Number | Name | Date |
|---|---|---|
| 2,124,598 | Turner | July 26, 1938 |
| 2,341,453 | Lieber et al. | Feb. 8, 1944 |
| 2,374,963 | Vass | May 1, 1945 |

OTHER REFERENCES

Willgerodt: "Berichte deutsche chem. Gesell.," vol. 20 (1887), p. 2467; ibid., vol. 21 (1888), p. 534.

Willgerodt "J. Prakt Chem.," vol. 80 (1909), pp. 183–200.

Willgerodt et al.: "J. Prakt Chem.," vol. 81 (1910), pp. 74–85, 382–402.

Cavalieri et al.: "J. Am. Chem. Soc.," vol. 67 (1945), p. 1783.

Willgerodt et al.: "J. Prakt Chem." vol. 84, p. 383.